May 24, 1932.  A. H. FLECK  1,859,697
BATH, BASIN, AND RECEPTACLE FITTING
Filed April 10, 1931
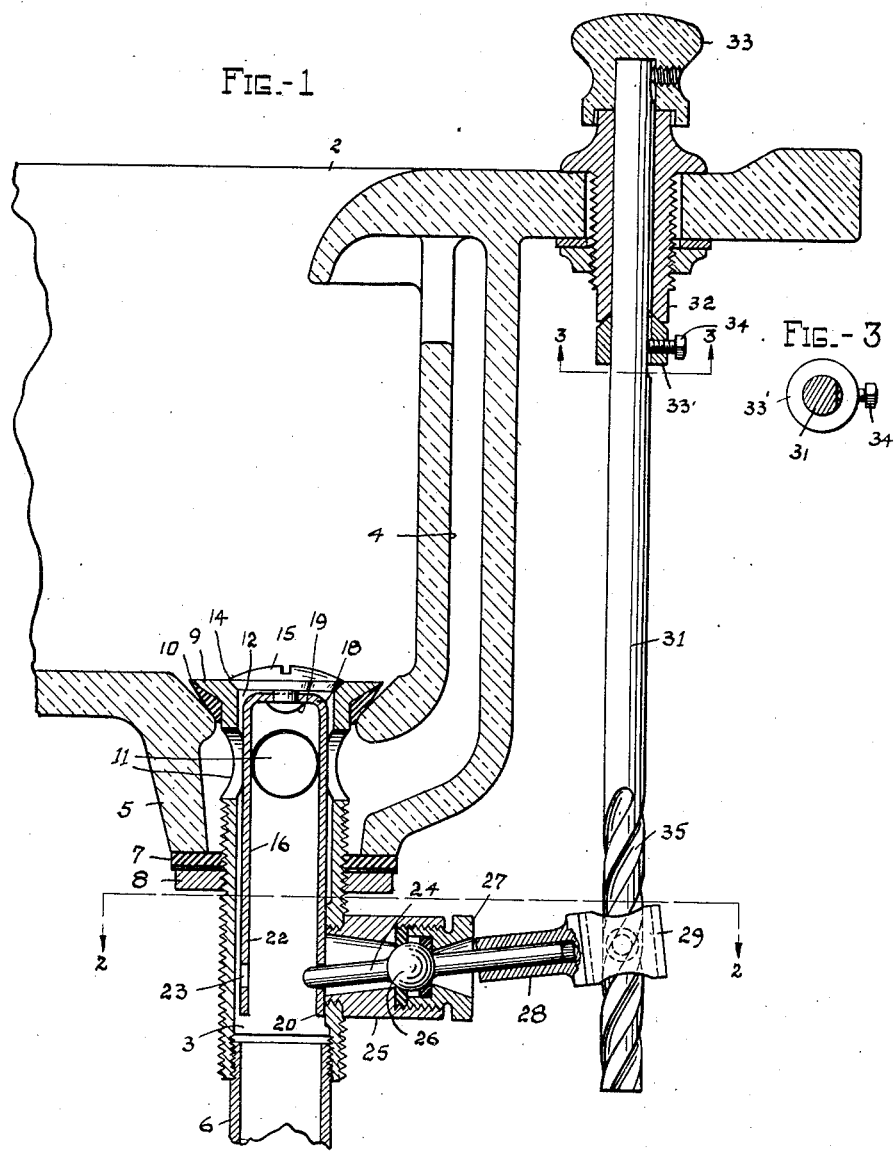
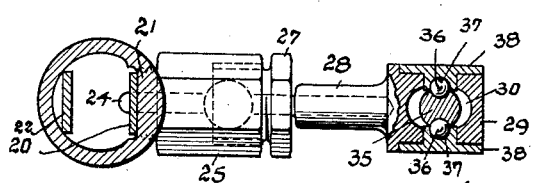
INVENTOR.
ALBERT H. FLECK
BY
Fisher, Moser & Moore.
ATTORNEY.

Patented May 24, 1932

1,859,697

UNITED STATES PATENT OFFICE

ALBERT H. FLECK, OF CLEVELAND, OHIO, ASSIGNOR OF TWO-FIFTHS TO MICHAEL B. KOELLIKER, OF CLEVELAND, OHIO

BATH, BASIN, AND RECEPTACLE FITTING

Application filed April 10, 1931. Serial No. 529,023.

My invention relates to bath, basin and receptacle fittings, especially outlet valves and operators therefor, and is an improvement over my outlet valve fitting and operating device described in my co-pending application, Serial No. 509,561, for fittings, filed January 19, 1931. The object of my present invention is to provide improved valve closing and opening means adapted to easily operate the valves with a minimum of friction and wear on the operating mechanism. This and other objects of my present invention are embodied in the specific construction shown in the accompanying drawings, in which Fig. 1 is a sectional view of a portion of a lavatory bowl or basin embodying my invention, and Fig. 2 a sectional view of the lower part of the waste fitting and spiral operating member on line 2—2 of Fig. 1. Fig. 3 is a cross section on line 3—3 of Fig. 1.

The receptacle shown in the drawings represents a portion of a lavatory basin 2 having a tubular outlet fitting 3 in its bottom and an overflow passage 4 in one side wall which opens into a chambered boss 5 through which fitting 3 extends. A discharge pipe 6 is connected to the lower end of tubular fitting 3, and a sealing washer 7 and screw nut 8 fasten the fitting tightly within boss 5. Fitting 3 has a flanged upper end 9 seated upon a sealing gasket 10 within the bottom of the basin, and the sides of the fitting contain openings 11 through which the overflow water may pass freely into the fitting from passage 4. The upper end 9 of the fitting contains a circular drain opening 12 bordered by a flaring valve seat 14, and a beveled disk-shaped valve 15 closes said drain opening tightly when lowered upon said seat. To permit the valve to find its seat readily it may be loosely connected to a guiding and supporting member 16 confined within the tubular fitting and free to slide vertically within limits therein. As shown in Figs. 1 and 2, member 16 is made of a flat strip of metal bent into a U-shape or yoke-shape to form a cross part 18 which is secured to a headed stud 19 depending from the bottom of valve 15. In some cases valve 15 must be ground to its seat, and the valve is therefore preferably connected in rotatable union with yoke member 16 to permit grinding operations. On the other hand it is not desirable to have the yoke member rotate within the tubular fitting, so one of the flat guiding legs 20 of this member extends downwardly in sliding engagement with a flat-sided boss 21 internally of the fitting to prevent rotation of the member. The opposite leg 22 of guiding member 16 engages the circular wall of the fitting, and one or both of the depending legs have openings 23 near their lower extremities to admit one end of an oscillatory rod or shaft 24 which is supported within a lateral branch 25 of the fitting. Branch part 25 may be made separable or integral with the body of the fitting, and the oscillatory shaft may have a spherical enlargement 26 between its opposite ends to permit this element to be socketed and held in place by a nut 27 and to oscillate in a vertical plane whereby the yoke may be reciprocated and the valve raised and lowered in respect to its seat. The outer end of oscillatory shaft 24 may be of any desirable length and it protrudes through nut 27 and carries a sleeve or tubular extension 28 having an angular enlargement 29 provided with an elongated slot 30 through which a spirally recessed rod 31 extends. Rod 31 is rotatably supported in a tubular bushing or sleeve 32 seated upon and fastened to the top of basin 2 and a knob or handle 33 is fixed to the upper end of rod 31 to facilitate rotation thereof within sleeve 32. Longitudinal movement of rod 31 is prevented by a locking collar 33' which is locked to the rod in tight engagement with the lower beveled edge of bushing or sleeve 32 by means of set screw 34.

The spiral recesses 35 of rod 31 engage with oppositely arranged balls 36 loosely confined within sockets 37 of side plates 38, which are fastened to the flat sides of the rectangular enlargement 29 of extension or attachment 28. The balls 36 project into the elongated slot 30 through which the rod 31 extends and are thus exposed for engagement with spiral grooves 35. The loose mounting of balls 36 within their sockets permits of rolling action of the balls when rod 31 is rotated and practically eliminates frictional contact and binding action of such rod with the part 29 during opening and closing operations of the valve.

What I claim, is:

1. In bath, basin and receptacle fittings, an outlet fitting and valve, oscillatory means for opening and closing said valve, axially rotatable means including a spirally grooved shaft for oscillating said opening and closing means and a ball bearing coupling between said oscillatory means and said axially rotatable means including oppositely disposed balls engaging the grooves of said shaft.

2. In bath, basin and receptacle fittings, an outlet fitting and valve, a lever for opening and closing the valve, an extension for said lever having an angular enlargement provided with an elongated slot therethrough, a spirally grooved shaft held against longitudinal movement extending through said elongated slot, plates closing opposite sides of said enlargement, oppositely disposed balls loosely confined in said plates engaging the grooves of said shaft.

3. In bath, basin and receptacle fittings, an outlet fitting and valve, a pivotally mounted lever for opening and closing the valve, an extension for said lever having an angular enlargement provided with an elongated slot therethrough, a spirally grooved shaft held against longitudinal movement extending through said elongated slot, plates closing opposite sides of said enlargement, oppositely disposed balls loosely confined in said plates engaging the grooves of said shaft.

In testimony whereof I affix my signature.

ALBERT H. FLECK.